United States Patent Office 2,706,289
Patented Apr. 12, 1955

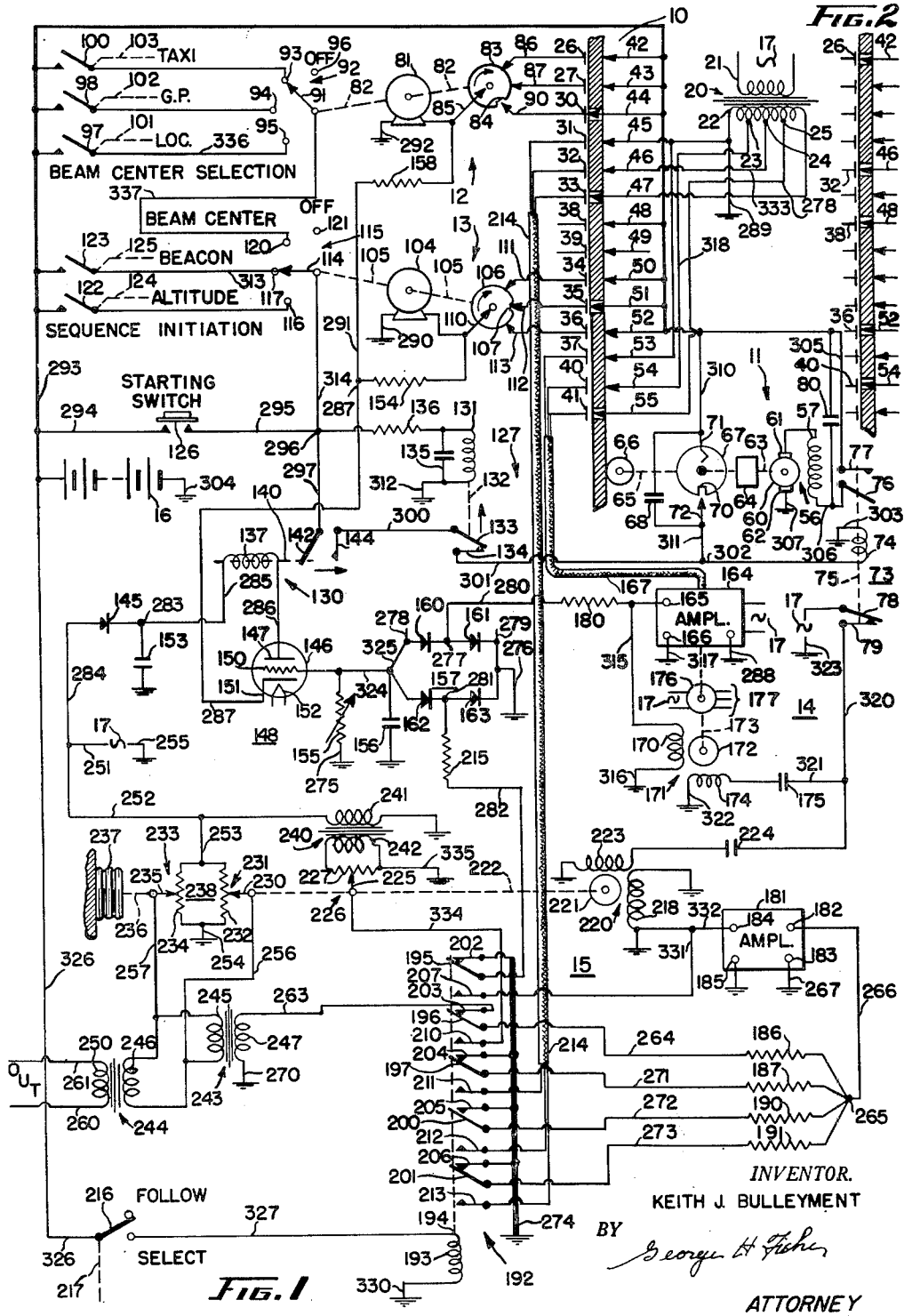

2,706,289

AUTOMATIC FLIGHT SEQUENCE CONTROLLER

Keith J. Bulleyment, St. Louis Park, Minn., assignor to Minneapolis-Honeywell Regulator Company, Minneapolis, Minn., a corporation of Delaware Application June 29, 1953, Serial No. 364,868

10 Claims. (Cl. 340—345)

This invention relates to the field of automatic control, and more particularly to apparatus for controlling a plurality of parameters of flight in accordance with the requirements of successive sections of an extended flight, including means for automatically sequencing the apparatus as the successive sections of the flight are completed. The broad general object of the invention is to provide improved apparatus of the class just described.

A more specific object of the invention is to provide an automatic sequencer in which prolonged operation of a starting switch cannot result in multiple sequencing.

Another object of the invention is to provide apparatus of the class described in which passage of a selector in the automatic sequencer over an energized contact in going to an unenergized contact cannot result in multiple sequencing.

Another object of the invention is to provide control apparatus of the type described which includes a telemetric system having alternative controlling and following conditions, and in which sequencing is prevented when said telemetric system is in said following condition or is being adjusted to control at a different control point.

Yet another object of the invention is to provide an automatic sequencer including a proportioning telemetric system and a homing type telemetric system for controlling the sequencing operation, in which the homing system is prevented from causing the sequencing operation while the proportioning system is in operation.

Various other objects, advantages, and features of novelty which characterize my invention are pointed out with particularity in the claims annexed hereto and forming a part hereof. However for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing:

Figure 1 is a schematic showing of the elements making up one embodiment of the invention, and of the preferred manner of interrelating these elements to give the desired operation to the system as a whole, and Figure 2 is a detail giving a second view of a record as used in Figure 1.

The invention herein comprises an advance over known automatic sequencing systems, of which a typical example is to be found in the copending application of Oscar Hugo Schuck, Serial No. 266,699, filed January 16, 1952, and assigned to the assignee of the present application. In the Schuck application the operation of a plurality of selectors is controlled by perforations in a continuous record, means being provided for advancing the record in discrete steps upon the achievement of any one of a plurality of conditions selected by one of the selectors.

The present invention shows a similar control record 10, driving means therefor generally indicated by the reference numeral 11, a pair of homing type telemetric systems 12 and 13, and a pair of proportioning type telemetric systems 14 and 15. Record 10 controls the passage of electrical energy from a source 16 of unidirectional voltage indicated as a battery, and from a source 17 of alternating voltage through a transformer 20 having a primary winding 21 and a secondary winding 22, the latter being provided with intermediate taps 23, 24 and 25.

As described in the copending Schuck application, record 10 may comprise a strip of heavy paper divided into successive fields. Each field may be considered as divided into unit areas, and a plurality of such areas may be defined as a data group, the data being represented by the presence or absence of perforations in the unit areas making up each data group. As an illustration the data group for any number in the decimal system between 000 and 999 may comprise three rows of 10 unit areas, one perforation in each row representing by its position a digit from 0 to 9.

As an alternative illustration, arbitrary meaning may be given to each of the unit areas in a data group: in the group reserved for beam center selection later to be described a first area may represent the localizer beam, a second area the glide path beam, a third the taxi beam, etc. The simplest arbitrary meaning which may be assigned to a single area is that of "on" and "off" according as the area is or is not perforated.

Readout means aligned with the control record must be provided to interpret the data represented by the various groups. In the drawing this function is shown schematically by mutually insulated contact elements 26, 27, 30, 31, 32, 33, 38, 39, 34, 35, 36, 37, 40 and 41 on one side of record 10 and spring contact fingers 42, 43, 44, 45, 46, 47, 48, 49, 50, 51, 52, 53, 54 and 55 on the other side of the record, but equivalent structures will of course occur to those skilled in the art. Perforations in the record are shown to permit engagement between contacts 30 and 44, 33 and 47, 35 and 51, and 41 and 55: it is not attempted to show the large number of perforations and contacts necessary to adequately perform with precision all the functions of a complete system of this nature.

The drive means 11 for record 10 is shown to comprise a series wound, non-reversing direct current motor 56 including a stator winding 57 and a wound rotor 60 having brushes 61 and 62. The shaft 63 of motor 56 drives a suitable gear speed reduction unit 64, and the output shaft 65 from unit 64 is connected to a sprocket or other wheel 66 arranged in engagement with record 10 to advance the latter with respect to the fixed and spring contacts, the latter rising out of the perforations in the paper as it advances.

More perfected chart driving and contact lifting means adapted to use in this structure are shown in a copending application of Raymond E. Michel, Serial No. 397,882 filed December 14, 1953, and assigned to the assignee of the present application. The intricacy of that structure is not necessary to an understanding of the present invention, however, and accordingly a simplified showing has been used herein.

To complete the description of drive unit 11 it is pointed out that a homing disc 67 of electrically conducting material is mounted on shaft 65. Disc 67 has a notch 70 in its periphery, and is continually engaged throughout its rotation by a spring contact 71. A second spring contact 72 engages the periphery of disc 67, in such a fashion that an electric circuit is completed through disc 67 between contacts 71 and 72 except when notch 70 is aligned with contact 72. A capacitor 68 is connected across contacts 71 and 72 to prevent sparking.

Motor 56 is energized from battery 16 under the control of a motor relay 73 shown to have a winding 74 which acts through an armature 75 to displace a first movable contact 76 into engagement with a first fixed contact 77, and to displace a second moveable contact 78 out of normal engagement with a second fixed contact 79. A capacitor 80 is connected across contacts 76 and 77 to prevent sparking.

Telemetric system 12 is shown to comprise a non-reversible direct current motor 81 whose shaft 82 carries a disc 83 of electrically conductive material notched at 84 and continuously engaged by a spring contact 85. Engaging the periphery of disc 84 are a plurality of spring contacts 86, 87, and 90. The arrangement is such that electrical connection is continuously maintained between contact 85 and all of contacts 86, 87 and 90 except when one of the latter is aligned with notch 84. Shaft 82 is extending to actuate the movable contact 91 of a selector switch 92 having fixed contacts 93, 94, 95 and 96. In actual practice switch 92 has a complete circle of fixed contacts around it, most of which are omitted here for simplicity.

Associated with switch 92 are a plurality of normally open switches 97, 98 and 100. Switch 97 is arranged to be operated by means indicated at 101 when the localizer receiver indicates that the craft is on the center of the localizer beam. Switch 98 is arranged to be operated by means indicated at 102 when the glide path receiver indicates that the craft is on the center of the glide path beam. Similarly switch 100 is arranged to be operated by means indicated at 103 when a radio receiver indicates that the craft is on the center of a taxi beam. Devices of this nature are known and their details are of no concern to the present invention.

Telemetric system 13 is shown to comprise a non-reversible direct current motor 104 whose shaft 105 carries a disc 106 of electrically conducting material notched at 107 and continuously engaged by a spring contact 110. Engaging the periphery of disc 84 are a plurality of spring contacts 111, 112 and 113. The arrangement is such that electrical connection is continuously maintained between contact 110 and all of contacts 111, 112 and 113, except when one of the latter is aligned with notch 107. Shaft 105 is extended to actuate the movable contact 114 of a selector switch 115 having fixed contacts 116, 117, 120 and 121. In actual practice switch 115 has a complete circle of fixed contacts associated with it, most of which are omitted here for simplicity.

Associated with switch 115 are a pair of normally open switches 122 and 123. Switch 123 is arranged to be operated by means indicated at 125 when the craft reaches a marker beacon. Switch 122 is arranged to be operated by means indicated at 124 when the craft attains a selected altitude. Devices of this nature are known and their details are of no concern to the present invention.

A normally open, momentary contact starting switch 126 is provided for putting the system in operation, and system operation is also controlled by a pair of relays 127 and 130. Relay 127 is shown to comprise a winding 131, which acts through an armature 132 to displace a movable contact 133 out of normal engagement with a fixed contact 134. Associated with relay 127 to give slow action of the relay are a capacitor 135 and a resistor 136. Relay 130 is shown to comprise a winding 137 which acts through an armature 140 to displace a movable contact 142 into engagement with a fixed contact 144.

Relay 130 is energized from source 17 through a rectifier 145 and through a lockout amplifier 148 including a triode 146 having an anode 147, a control electrode 150, a cathode 151 and a heater 152 energized in a conventional fashion not shown. Associated with rectifier 145 is a filter capacitor 153, and associated with triode 146 are a pair of cathode resistors 154 and 158, a variable grid resistor 155, a capacitor 156, and a rectifier network 157 shown by way of illustration to comprise rectifiers 160, 161, 162, and 163.

Proportioning telemetric system 14 is shown to comprise an amplifier 164 energized from source 17 and having output terminals 165 and 166. Amplifier 164 is supplied with a control signal through a cable 167. The output of amplifier 164 energizes the amplifier phase winding 170 of an alternating current motor 171 having a rotor 172, mounted on a shaft 173, and a line phase winding 174 with which is associated a quadrature capacitor 175. Through shaft 173 and such reduction gearing, not shown, as may be desirable motor 171 drives a synchro transmitter 176 energized from source 17 and supplying an output on conductors 177. The drive from motor 171 is continued to operate balancing means in amplifier 164 so as to balance the signal on cable 167, as is well known.

The purpose of proportioning system 14 is to supply on conductors 177 a signal representative of a desired value of a condition which may vary through a range: one example of such a condition is the heading of the craft, which may vary through 360 degrees. The signal on conductors 177 may be compared in conventional apparatus not shown with a signal representing the actual heading of the craft, and the difference between the signals may be used to operate the heading control surfaces of the craft.

An output from amplifier 164 is supplied to network 157 through an isolating resistor 180.

Proportioning telemetric system 15 is shown to comprise an amplifier 181 having input terminals 182 and 183 and output terminals 184 and 185. Amplifier 181 is supplied with a signal through one or more of a plurality of summing resistors 186, 187, 190, and 191 under the control of a relay 192 having a winding 193 which acts through an armature 194 to displace movable contacts 195, 196, 197, 200, and 201 out of normal engagement with fixed contacts 202, 203, 204, 205, and 206 and into engagement with fixed contacts 207, 210, 211, 212, and 213. Associated with relay 192 are a signal cable 214, an isolating resistor 215, and a switch 216 actuated by suitable means 217, under the control of record 10 if desired.

Amplifier 181 energizes the amplifier phase winding 218 of an alternating current motor 220 having a rotor 221, mounted on a shaft 222, and a line phase winding 223 with which is associated a quadrature capacitor 224. Shaft 222 is extended to operate the slider 225 of a rebalance voltage divider 226 having resistance element 227 and the slider 230 of a selecting voltage divider 231 having a resistance element 232. A further voltage divider 233 is shown to have a resistance element 234 and a slider 235 actuated through a mechanical connection 236 by an altimeter 237. Voltage dividers 231 and 233 together make up an electric bridge 238. Windings 232 and 234 are energized from source 17 directly. Winding 227 is energized from source 17 through a transformer 240 having a primary winding 241 and a secondary winding 242. If convenient secondary winding 242 may be a part of transformer 20, rather than of the separate transformer.

The output from bridge 238 is supplied to utilization circuits through a pair of transformers 243 and 244 having primary windings 245 and 246 and secondary windings 247 and 250, all respectively.

As mentioned above, the invention as illustrated has been radically simplified to facilitate pointing out the inventive contributions. In practice not only do each of switches 92 and 115 have more contacts, but there are more homing systems and more proportioning systems, the number of each being limited only by the number of flight characteristics it is desired to control, select, or monitor.

In one preferred embodiment of the invention the following values were found satisfactory for the components listed:

| | |
|---|---|
| Source 16 | 28 v. D. C. |
| Source 17 | 115 v., 400 cycles, 1 phase. |
| Resistor 136 | 5,000 ohms. |
| Resistor 154 | 100 ohms. |
| Resistor 155 | 15,000–25,000 ohms. |
| Resistor 158 | 100 ohms. |
| Resistor 180 | 100,000 ohms. |
| Resistor 186 | 1,000,000 ohms. |
| Resistor 187 | 1,000,000 ohms. |
| Resistor 190 | 1,000,000 ohms. |
| Resistor 191 | 1,000,000 ohms. |
| Resistor 215 | 100,000 ohms. |
| Resistor 227 | 0–5,000 ohms. |
| Resistor 232 | 0–10,000 ohms. |
| Resistor 234 | 0–10,000 ohms. |
| Capacitor 68 | .01 microfarad. |
| Capacitor 80 | 1 microfarad. |
| Capacitor 135 | 100 microfarads. |
| Capacitor 153 | 4 microfarads. |
| Capacitor 156 | 4 microfarads. |
| Capacitor 175 | .12 microfarad. |
| Capacitor 224 | .12 microfarad. |

*Operation*

Except for relay 130, the apparatus of Figure 1 is shown in the condition it finally assumes in response to the illustrated perforations in record 10. Sources 16 and 17 are connected to supply electrical energy. Motors 56, 81, and 104 are inoperative so that discs 67, 83 and 106 and switches 92 and 115 are as shown. Proportioning systems 14 and 15 are balanced so that no signal voltages appear at output terminals 165 and 166 and output terminals 184 and 185, and motors 171 and 220 are deenergized. Relays 73, 127, and 192 are as shown, and switches 97, 98, 100, 122, 123, 126, and 216 are open. Sliders 230 and 245 are equally spaced from the upper ends of their resistance elements, and slider 225 is spaced from the right hand end of its resistance element in the same proportion. Assume that the craft is in flight at 5000 feet altitude, which determines the position of slider 235. The means whereby relay 130 is pulled in will now be explained.

It will be seen that grid 150 of triode 146 is grounded, at 275, through resistor 155 and also at 276, through rectifiers 160 and 161 and rectifiers 162 and 163 of network 157. The network can be continued, as illustrated by conductors 278 and 279, to include further pairs of rectifiers as the number of proportioning systems in the apparatus is increased. The common point 277 between rectifiers 160 and 161 is connected through conductor 280 and resistor 180 to terminal 165 of amplifier 164: since proportioning system 14 is balanced, terminal 165 is at ground potential. The common point 281 between rectifiers 162 and 163 is connected through resistor 215, conductor 282, and relay contacts 195 and 202 to ground bus 274. Accordingly grid 150 is at ground potential.

The anode voltage for triode 146 is supplied at a terminal 283 from source 17, through conductors 251 and 284 and rectifier 145: the rectified voltage is filtered by capacitor 153.

The anode circuit for triode 146 may be traced from terminal 283 through conductor 285, relay winding 137, conductor 286, anode 147 and cathode 151 of triode 146, conductor 287, resistor 154, and the winding of motor 104 to ground connection 290: also connected to conductor 287 is a further circuit including conductor 291, resistor 158, the winding of motor 81, and ground connection 292. The equivalent resistance between cathode 151 and ground is sufficiently small that little self biasing takes place, and triode 146 conducts, pulling in relay 130. A circuit is completed at contacts 142 and 144 which will presently be traced, and such additional pairs of contacts as are considered desirable may be provided to control other output circuits such as that of proportioning system 15.

A circuit may be traced from source 17 through conductors 251, 252, and 253, resistance element 234, and ground connections 254 and 255 back to the source: from conductor 253 a further circuit may be traced to ground connection 254 through resistance element 232. A bridge output circuit may be traced from slider 230 through conductor 256, primary winding 245 and conductor 257 to slider 235: primary winding 246 is connected in parallel with primary winding 245.

The output from proportioning system 15 is taken from secondary winding 250 through conductors 260 and 261. This output is designed to be supplied to suitable altitude control apparatus, not shown, to determine the altitude at which the craft flies, as is well known in the art. Any suitable means not shown may be provided to perform the switching function of making the altitude control apparatus operative: under the conditions now being described this is not done, so that the altitude of the craft remains under manual or other control.

A circuit may be traced from the upper terminal of secondary winding 247 through conductor 263, relay contacts 203 and 196, conductor 264, summing resistor 186, summation point 265, and conductor 266 to input terminal 182 of amplifier 181, the circuit being completed from input terminal 183 through ground connections 267 and 270. Summing resistors 187, 190, and 191 are also connected to summation point 265, but their other terminals are grounded through conductors 271, 272, and 273, moveable relay contacts 197, 200, and 201, and fixed relay contacts 204, 205, and 206, all respectively, and ground bus 274, so that the signal from secondary winding 247 is the only one supplied to amplifier 181.

As long as sliders 230 and 235 are equally displaced downwardly along their respective resistance elements, the signal supplied by secondary winding 247 is zero. If the altitude of the craft changes, slider 235 is moved with respect to resistance element 234 by altimeter 237, and a signal appears between sliders 230 and 235 and is transmitted by transformer 243 to amplifier 181. Motor 220 is energized, operating in a sense to move slider 230 in the same direction as slider 235 until the sliders are again aligned: bridge 238 is then balanced and operation of motor 220 is interrupted.

For normal vertical movements of the craft in response to its elevator displacement, slider 230 follows slider 235 so closely that the signal from transformer 243 is only slightly greater than the threshold voltage of amplifier 181. In strong vertical air currents or turbulent air, on the other hand, it is possible for altimeter slider 235 to move faster than motor 220 can drive slider 230, so that temporary signals of some magnitude can be supplied by transformer 244. Since the altitude controller has not been placed in operation, however, this has no undesirable effect on the control of the craft.

A circuit may now be traced from tap 25 of transformer 20 through conductor 278, contacts 55 and 41 and cable 167 to amplifier 164, the circuit being completed through ground connections 288 and 289. Amplifier 164 includes a set of summing resistors like those associated with amplifier 181, and the balancing arrangement actuated by shaft 173 may be a voltage divider and a transformer energized from source 17, resembling units 226 and 240 discussed above. In the stable condition of the apparatus here assumed the balance condition has been reached, and an output has been supplied on conductors 177 suitable to adjust a heading controller not shown so that it maintains the heading of the craft at 270°, or due west, as an example. Transmission of the signal from synchro 176 may be controlled by any suitable switching means not shown and suitable further means are preferably provided for establishing operation of the heading controller.

Except for the following movement of slider 230 as the altitude of the craft changes, and for the operation of triode 146 and relay 130, the apparatus is in the condition illustrated in Figure 1, and this continues as the craft continues in flight. Two means are provided for changing this state of affairs: one is an emergency measure, and the other is a part of the normal operation of the apparatus. The former will be discussed first, and is accomplished by the human pilot simply by closing switch 126 momentarily. The effect of this is to advance record 10 so that a new field of data groups is aligned with the readout means, and hence the switch should not be operated unless the succeeding field carries data pertinent to the flight conditions presently desired.

Closure of switch 126 completes a circuit from the positive terminal of source 16 to positive bus 293, thence through conductor 294, switch 126, conductor 295, junction point 296, conductor 297, relay contacts 142 and 144 now closed, conductor 300, relay contacts 133 and 134, conductors 301 and 302, relay winding 74, and ground connections 303 and 304 to the negative terminal of source 16. Relay 73 pulls in, completing a circuit for motor 56 from positive bus 293 through conductor 305, relay contacts 77 and 76, and conductor 306, the circuit being completed through ground connection 307. Operation of motor 56 rotates disc 67 into engagement with contact 72, completing a circuit from positive bus 293 through conductor 310, contact 71, disc 67, contact 72, and conductors 311 and 302 to relay winding 74. Switch 126 may now be released: operation of motor 56 through a complete cycle is ensured by homing disc 67.

It is conceivable that one not familiar with the apparatus might maintain switch 126 closed for a longer interval than that required for a cycle of operation of motor 56, in which event a second cycle of operation of the motor would be carried out. This would result in an unintended advance of record 10 beyond the field of data appropriate to the location and condition of the craft, and would thus establish a dangerous condition of continuing discoordination in the control apparatus. To avoid this, relay 127 is provided. A circuit extends from junction point 296 through resistor 136 to winding 131 of relay 127 and to capacitor 135, the circuit being completed through ground connection 312. When switch 126 is closed capacitor 135 begins to charge exponentially toward a value determined by the voltage of source 16 and by the relation between the resistance of resistor 136 and the direct current resistance of winding 131. The resistor and the winding cooperate to form a voltage divider, thus determining the steady state voltage across winding 131. At some point in the charging curve of the capacitor the voltage thereacross is sufficient to cause relay 127 to pull in, thus interrupting at contacts 133 and 134 the circuit between switch 126 and relay 73. The interval required to accomplish this is chosen, by proper selection of components, to be greater than the interval required for motor 56 to drive disc 67 into engagement with contact 72, but smaller than a complete cycle of operation of motor 56. Thus improper cycling because of switch 126 being held down is prevented.

In normal operation of the apparatus switch 126 is operated briefly, for only a short portion of the period of disc 67. If switch 126 is released before relay 127 pulls in, a circuit for the latter relay may be traced from positive bus 293 through conductor 310, contact 71, disc 67, contact 72, conductors 311 and 301, relay contacts 134 and 133, conductor 300, contacts 144 and 142, conductor 297, and resistor 136. This circuit is interrupted when relay 127 operates, or when switch 126 is released if this occurs later, and capacitor 135 discharges through winding 131. Since the resistance in the discharge path of the capacitor is less than that in the charging path, the capacitor discharges more rapidly than it charged, and the voltage across winding 131 quickly drops below the value necessary to hold the relay in: when it drops out the circuit through the contacts 133 and 134 to relay winding 74 is again completed.

The foregoing description has been directed to the function of switch 126, which is basically an emergency or starting component. Normally this is not needed, the flight continuing under the control of record 10 until the craft assumes a predetermined condition, which is shown in Figure 1 as passing over a radio beacon. This results in closure of switch 123 completing a circuit from positive bus 293 through the switch, conductor 313, contacts 117 and 114 of switch 115, and conductor 314 to terminal 296, thus energizing the circuit for motor relay 73 and slow acting relay 127 described above, and motor 56 is again energized as before.

Operation of motor 56, whether by manual or automatic means, displaces control record 10 so that the field thereof shown in Figure 1 is replaced by the one containing the data groups illustrated in Figure 2 and other groups. This second field of punchings has been prepared for cooperating with the readout contacts to call for flight of the craft at a controlled altitude of 1500 feet, with a heading of 0°, until the localizer beam has been intersected. Perforations in the record now allow engagement between contacts 42 and 26, 46 and 32, 48 and 38, 52 and 36, and 54 and 40. It has been found helpful in realizing the invention to introduce a resilient or lost motion connection between disc 67 and the record feeding means 66 so that the last 45 degrees or so of rotation of disc 67 occur after the new field of data is in place. This allows certain functions about to be described to take place before notch 70 comes into alignment with contact 72 to deenergize motor 56: the circuit for relay 73 through switches 123 and 115 must be opened, for example.

A first circuit is completed, from positive bus 293, through readout contacts 42 and 26, disc contact 86, disc 83 and contact 85 to motor 81, the circuit being completed through ground connection 292. The signal at contact 85 is also transmitted through resistor 158 and conductors 291 and 287 to cathode 151, making the latter positive with respect to ground by an amount sufficient to cut off triode 146, and relay 130 drops out, interrupting the circuit from junction point 296 to relay winding 74 if it has not already been interrupted by relay 127.

When the readout contacts complete their engagement a further circuit can be traced from positive bus 293 through readout contacts 52 and 36, disc contact 113, disc 106, and contact 110 to motor 104, the circuit being completed through ground connection 290. The voltage at contact 110 is also transmitted through summing resistor 154 and conductor 287 to cathode 151, cooperating with that from resistor 158 to make the cathode positive with respect to the grid. The two resistors are so chosen that regardless of how many of motors 81 and 104 are energized, discharge of the triode is still cut off.

The choice of resistors 154 and 158 is also influenced by the fact that a circuit may be traced from contact 110 for example through resistor 154, conductor 291, and resistor 158 to motor 81: if motor 81 is not energized through disc 83, but motor 104 is energized through disc 106, the current in the circuit just traced must not be large enough to cause operation of motor 81. The opposite relationship is also possible, and the same precautions as to size of resistors 154 and 158 will prevent improper energization of motor 104 when motor 81 is energized.

A final consideration in determining the size of resistors 154 and 158 is that they must be small enough so as not to introduce self biasing in the triode circuit to the extent that the triode does not conduct sufficient current to actuate relay 130.

Operation of motor 81 displaces disc 83 to a point where notch 84 is aligned with contact 86, thus interrupting the motor energizing and triode biasing circuit through contact 85, and operation of motor 104 displaces disc 106 to a point where notch 107 is aligned with contact 113, thus interrupting the motor energizing and triode biasing circuit through contact 110. If no other factors are acting, triode 146 now conducts and relay 130 pulls in, partially reestablishing the sequencing circuit to relay 73. Switch contact 91 has been moved into engagement with contact 95, and switch contact 115 has been moved into engagement with contact 120 and out of engagement with contact 117. This latter change interrupts the energizing circuit for relay 127 and the relay drops out, completing the reestablishment of the sequencing circuit for relay 73.

The perforation in record 10 allowing engagement between readout contacts 54 and 40 supplies a signal from transformer 20 through conductor 318, the readout contacts, and cable 167 to amplifier 164: this supplies alternating voltage at output terminals 165 and 166 which is transmitted to winding 170 of motor 171 by conductor 315 and ground connections 316 and 317. The line phase winding 174 of motor 171 is energized from source 17 through contacts 78 and 79, conductors 320 and 321, quadrature capacitor 175, and ground connections 322 and 323. Motor 171 operates in a sense to rebalance amplifier 164 through shaft 173, and to drive synchro 176 to give on conductors 177 a signal representative of a heading of 0 degrees. The auxiliary function of turning on the heading control is performed here by suitable apparatus not specifically shown.

As long as amplifier 164 remains unbalanced a voltage appears between terminal 165 of the amplifier and ground. When terminal 165 is negative a circuit may be traced from terminal 166 through ground connections 317 and 275, variable resistor 155, conductors 324 and 325, rectifier 160, junction point 277, conductor 280 and resistor 180 to terminal 165. Capacitor 156 is connected between grid 150 and ground to filter the signal supplied across resistor 155. In the next half cycle, when terminal 165 is positive, a further circuit may be traced from terminal 165 through resistor 180, conductor 280, junction point 277, rectifier 161 and ground connections 276 and 317 to terminal 166 of the amplifier. By this expedient rectifier 160 is prevented from being subjected to dangerously high inverse voltages.

Variable resistor 155 constitues a threshold adjustment for the lockout amplifier. It acts with resistor 180 as a voltage divider across terminals 165 and 166 of amplifier 164. The larger resistor 155 is, the greater the portion of the amplifier voltage that appears on the grid. However the amplifier voltage includes not only the useful component, which is of the frequency of source 17 and of a selected phase, but also includes "noise" such as out of phase components, components of double frequency, and so on. These noise components do not affect the motor, but are converted to a direct voltage signal by rectifier 160 and capacitor 156 and hence affect the triode. It is necessary to select such a value for resistor 155 that the unwanted or noise components of the amplifier signal do not cut off the triode: in order to accomplish this some sensitivity of the tube to the desired signal must be sacrificed.

It is found that the characteristics of the components making up this circuit change with ambient temperature, so that resistor 155 cannot be given a fixed value, but must be adjustable as temperature changes if optimum operation at all ambient temperatures is to be obtained.

When grid 150 is driven to cutoff, triode 146 interrupts the energization of relay 130 which accordingly drops out, disabling the sequencing circuit. It should be pointed out that motors 81 and 104 are relatively quick acting, while motor 171 and also motor 220 are slow operating. As a result the sequence circuit is normally controlled by relay 130 rather than by relay 127, and by the grid signal on triode 146 rather than the cathode signal: the complete circuit is however necessary for entire safety in operation of the system.

Since it is desired to control the altitude of the craft switch 216 is now closed, and the altitude controller is energized through simple switching functions not illustrated. When switch 216 closes a circuit is completed from the positive terminal of source 16 through conductor 326, switch 216, conductor 327, relay winding 193, and ground connections 330 and 304: relay 192 accordingly pulls in. A circuit may now be traced from junction point 281 through resistor 215, conductor 282, relay contacts 195 and 207, and conductors 331 and 332 to output terminal 184 of amplifier 181: this circuit functions as described in connection with amplifier 164, resistor 180, and rectifiers 160 and 161.

Operation of relay 192 ungrounds summing resistors 187, 190, and 191 at contacts 204, 205 and 206, and connects them instead through contacts 211, 212, and 213, and cable 214 to readout contacts 31, 32, and 33. Figure 2 shows that contacts 32 and 46 are in engagement supplying voltage from transformer tap 24 through conductor 333 to contact 32 and hence through cable 214, relay contacts 212 and 200, conductor 272 and summing resistor 190 to summation point 265. Summing resistor 186 is disconnected from transformer 243 at relay contact 203, and is instead connected through relay contact 210 and conductor 334 to slider 225, the circuit being completed through ground connections 335 and 267.

The inputs to amplifier 181 now come from transformer tap 24 and slider 225. If these signals are not equal and opposite motor 220 operates, adjusting slider 225 to bring about this condition, and simultaneously adjusting slider 230, to change the bridge output voltage and supply a signal to the altitude controller. Slider 230 acts now as an altitude selector: when the altitude of the craft has been changed sufficiently to bring slider 235 into alignment with slider 230, by operation of altimeter 237, the bridge is again balanced, and the output on conductors 260 and 262 becomes zero.

It should be emphasized that slider 230 is driven at the speed of motor 220 to a position determined by the punchings in the data group aligned with contacts 31, 32 and 33. While motor 220 operates slowly in comparison with motors 81 and 104, it completes its operation in an exceedingly brief interval compared with that required for the aircraft to reach the desired altitude. Accordingly the voltage supplied from terminal 184 of amplifier 181 continues for only a brief interval and thereafter remains zero until the record advances: in this configuration of the apparatus systems 14 and 15 are alike, and conductor 331 could be connected directly to conductor 282.

On the other hand, it was pointed out above that when relay 192 is deenergized the output from amplifier 181 may have considerable magnitude at any time, if the craft is subject to rapid changes in altitude. If under these circumstances conductor 331 were connected directly to conductor 282, triode 146 might be cut off at any unpredictable time, and sequencing at a proper instant might easily be prevented. It is for this reason that conductor 331 goes through relay 192 while conductor 280 does not.

As a result of the operation of motors 56, 81, 104, 171, and 220 a condition is reached in which switch contact 91 engages fixed contact 95, switch contact 114 engages fixed contact 120, synchro 176 and slider 230 are adjusted to select the heading and altitude called for by record 10, and triode 146 maintains relay 130 energized. This continues until the craft reaches the center of the localizer beam, when radio means not shown functions to close switch 97. A circuit may now be traced from positive bus 293 through switch 97, conductor 336, switch contacts 95 and 91, conductor 337, switch contacts 120 and 114 and conductor 314 to junction point 296, to initiate operation of motor relay 73 as described above, and the cycle of operation repeats itself.

The purpose of lockout amplifier 146 and relay 130 will now be apparent. Each field of data groups in record 10 represents a set of flight conditions which must be achieved concurrently. The changeover period when the record is advanced is one in which different adjustments are taking place at different rates, and in which a selection is being made of what parameter is to be used to trigger the next sequencing operation.

Switch 115 may pass over a contact connected to positive bus 293 in going toward a selected contact which is not so connected, or switch 125 or switch 96 may be engaging a contact which is connected to the positive bus when the new field of data groups becomes active. Any of these events could conceivably cause undesired resequencing of the record. Moreover a perceptible interval is required for proportioning systems 14 and 15 to become balanced at new values, and it is undesirable to connect the outputs of these systems to control the craft until the systems have become balanced. The cathode and grid circuits of lockout amplifier 146 are connected to be influenced by these conditions, and relay 130 is held in its deenergized position until the last of them has been satisfied. Thereafter the relay is pulled in and sequencing can be initiated automatically or manually.

From the foregoing it will be evident that I have invented improved automatic sequencing equipment in which multiple sequencing is prevented, whether due to improper manual operation or to characteristics of homing and proportioning systems included in the equipment.

Numerous objects and advantages of my invention have been set forth in the foregoing description, together with the details of the structure and function of the invention, and the novel features thereof are pointed out in the appended claims. The disclosure, however, is illustrative only, and I may make changes in detail within the principle of the invention to the full extent indicated by the broad general meaning of the terms in which the appended claims are expressed.

I claim as my invention:

1. Apparatus of the class described comprising, in combination: a source of electrical energy; cyclic drive means to be energized from said source; first and second circuits connecting said drive means to said source; homing switch means in said first circuit for maintaining energization of said drive means through a full cycle of operation thereof once said cycle has been initiated; a plurality of groups of condition responsive switches in said second circuit connected to said source and closed on the occurrence of a plurality of conditions; selector switches in said second circuit connected severally to said groups of condition responsive switches for completing a circuit between said drive means and any selected one of said condition responsive switch means; rapid acting motor means connected to said selector switches for causing operation thereof; manual switching means in said second circuit connected to said source; slow acting relay means in said second circuit and energized through said manual switching means, and through said condition responsive switch means and said selector switches, for interrupting said second circuit after it has been completed for a sufficient interval to permit operation of said homing switch means to complete said first circuit; telemetric means for causing operation of said motor means to adjust said selector switches to desired settings, including a control record, having a series of fields of data groups representative of a series of sets of concurrent desired selecting states for said selector switches, and readout means aligned with said record and connected to said source for energizing said motor means in accordance with the data contained in particular ones of said groups; means connecting said drive means to said control record so that each cycle of operation of said drive means replaces one of said fields aligned with said readout means by a succeeding field, whereby said record may be advanced upon closure of a condition responsive switch selected by a data group in said record, and a new condition responsive switch may thereupon be selected to cause subsequent advance of said record upon the occurrence of the condition selected thereby; further selecting means adjustable through a range of adjustments; slow acting motor means for adjusting said further selecting means; telemetric means including said control record for causing operation of said slow acting motor means to adjust said further selecting means to any desired position within said range; and further relay means in said second circuit connected to said further selecting means for operation during energization of said slow acting motor means to interrupt said second circuit.

2. Apparatus of the class described comprising, in combination: a source of electrical energy; cyclic drive means to be energized from said source; first and second circuits connecting said drive means to said source; homing switch means in said first circuit for maintaining energizaton of said drive means through a full cycle of operation thereof once said cycle has been initiated; a plurality of condition responsive switches in said second circuit connected to said source and independently closed on the occurence of a plurality of conditions, so that more than one of said switches may be closed at the same time; a selector switch in said second circuit connected to said condition responsive switches for completing a circuit to said drive means from any selected one of said condition responsive switch means; rapid acting motor means connected to said selector switch for causing operation thereof; slow acting relay means normally completing said second circuit and energizable through said condition responsive switches and said selector switch to interrupt said second circuit after it has been completed for a sufficient interval to permit operation of said homing switch to complete said first circuit; telemetric means for causing operation of said motor means to adjust said selector switch to complete said second circuit through any desired condition responsive switch, including a control record having a series of data groups representative of a series of adjusted conditions of said selecting switch, readout means aligned with said record and connected to said source for energizing said motor means in accordance with the data contained in the data groups aligned with said readout means, and means connecting said control record to said drive means so that each cycle thereof replaces the data group aligned with said readout means by a succeeding group, whereby said record may be advanced upon closure of a condition responsive switch selected in accordance with the data of a first data group in said record, the succeeding data group may cause operation of said selector switch to select a new condition responsive switch to cause subsequent advance of said record, said slow acting relay maintaining said second circuit open after said motor means initiates operation of said selector switch for an interval sufficient to allow said selector switch to select any condition responsive switch required by the data group now aligned with said readout means, so that if said selector switch passes over a circuit connected to a closed condition responsive switch, in moving to a circuit connected to an open condition responsive switch, renewed operation of said drive means cannot be initiated.

3. Apparatus of the class described comprising, in combination: a plurality of condition selecting devices each adjustable through a range of adjustment; means connected thereto for adjusting each of said devices to select any condition within its range; a control record having a series of fields of data groups representative of a series of sets of concurrent desired selecting states for said selecting devices; drive means connected to said control record for operation to advance said record by successive increments determined in magnitude by a dimension of said fields; initiating means included among said selecting devices for selecting a condition upon the occurrence of which operation of said drive means is to take place; readout means adjacent said record and connected to said first named means and said drive means for converting the data groups comprised in a field thereof aligned with said readout means to signals causing operation of said first named means and said drive means determined by the data making up said groups; and switching means connected to at least one of said selecting devices and in circuit with said drive means to prevent operation of said drive means from continuing for a second of said increments until the condition selected by said initiating means, in accordance with a data group in the field presented to said readout means by a first of said increments, has been achieved.

4. Apparatus of the class described comprising, in combination: a plurality of condition selecting devices each adjustable through a range of adjustment; means connected thereto for adjusting each of said devices to select any condition within its range; a control record having a series of fields of data groups representative of a series of sets of concurrent desired selecting states for said selecting devices; drive means connected to said control record for operation to advance said record by successive increments determined in magnitude by a dimension of said fields; initiating means included among said selecting devices for selecting a condition upon the occurrence of which operation of said drive means is to take place; readout means adjacent said record and connected to said first named means and said drive means for converting the data groups comprised in a field thereof aligned with said readout means to signals causing operation of said first named means and said drive means determined by the data making up said groups; manual means connected to said drive means and operable independently of said initiating means to cause operation of said drive means; and means including a slow acting relay connected to said manual means and in circuit with said drive means to prevent operation of said drive means from continuing for more than one of said increments regardless of how long said manual means remains operated.

5. Apparatus of the class described comprising, in combination: a plurality of condition selecting devices each adjustable through a range of adjustment; means connected thereto for adjusting each of said devices to select any condition within its range; a control record having a series of fields of data groups representative of a series of sets of concurrent desired selecting states for said selecting devices; drive means connected to said control record for operation to advance said record by successive increments determined in magnitude by a dimension of said fields; initiating means included among said selecting devices for selecting a condition upon the occurrence of which operation of said drive means is to take place; readout means adjacent said record and connected to said first named means and said drive means for converting the data groups comprised in a field thereof aligned with said readout means to signals causing operation of said first named means and said drive means determined by the data making up said groups; manual means connected to said drive means and operable independently of said initiating means to cause operation of said drive means; and switching means connected to at least one of said selecting devices and said manual means and in circuit with said drive means to prevent uninterrupted operation of said drive means for more than one of said increments.

6. Apparatus of the class described comprising, in combination: first signal means giving a first signal in accordance with the actual value of a condition; second signal means adjustable to give a second signal in accordance with a selected value of the condition; motor means connected to adjust said second signal means; motor control means connected to said motor for controlling the operation thereof in accordance with an input signal; telemetric means for giving a first input signal for said motor control means, including a control record having a series of fields of data groups, one group in each field being representative of a desired value of the condition, readout means aligned with said record for supplying a signal in accordance with the data in a data group comprised in said record, and drive means connected to said record for energization to replace one of said fields aligned with said readout means by a succeeding field; means connected to said signal means for supplying a second input signal for said motor control means which varies in accordance with the difference between said first and second signals; means connected to said second signal means for supplying a third input signal for said motor control means which varies in accordance with the selected value of the condition; switching means connected to said motor control means, to the two last named means, and to said telemetric means, and having a normal condition in which said motor control means is supplied with said second input signal, and an operated condition in which the motor control means is supplied with said first and third input signals; lockout means connected to said drive means and energizable to prevent energization of said drive means; and means, including said switching means in the operated condition thereof, for energizing said lockout means from said motor control means.

7. Apparatus of the class described comprising, in combination: a control record having a series of fields of data groups, each group being representative of one of a series of desired values for one of a plurality of conditions; readout means adjacent said record for converting to control signals the data groups comprised in a field thereof aligned with said readout means; drive means connected to said control record for operation to advance said record by successive increments determined in magnitude by a dimension of said fields; slow acting selecting means connected to said readout means for operation to select values for a plurality of conditions in accordance with data in a plurality of said data group; means responsive to the actual value of a first of said conditions; lockout means connected to said selecting means for preventing operation of said drive means until all the selecting means connected thereto have completed operation; switching means connected to said condition responsive means, to said readout means, and to the selecting means for said first condition and operable between a normal position in which said selector is connected to follow said responsive means, and an operated position in which said selector is connected for operation in accordance with said readout means; and means including said switching means in the normal position thereof for disconnecting said lockout means from the selecting means for said first condition.

8. Apparatus of the class described comprising, in combination: a control record; record driving means; record readout means; rapid acting means connected to said readout means for selecting, in accordance with data read out from said record, one of a number of conditions achivement of which is to energize said drive means; slow acting means connected to said readout means for performing a further function in accordance with data read out from said record; and means connected to said driving means and said slow acting means, and operative while said slow acting means is in operation to prevent energization of said driving means.

9. Apparatus of the class described comprising, in combination: a control record; record driving means; record readout means; rapid acting means for selecting, in accordance with data read out from said record, one of a number of conditions achievement of which is to energize said drive means; slow acting means for performing a further function in accordance with data read out from said record; and means connected to said driving means and said rapid acting means, and operative while said rapid acting means is in operation to prevent energization of said driving means.

10. Apparatus of the class described comprising, in combination: a control record; record driving means; record readout means; rapid acting motor means for selecting, in accordance with data read out from said record, one of a number of conditions achievement of which is to energize said drive means; slow acting motor means for performing a further function in accordance with data read out from said record; and means connected to said driving means and said motor means, and operative while either motor means is in operation to prevent energization of said driving means.

References Cited in the file of this patent

UNITED STATES PATENTS 2,612,331     Frazier et al. _____ Sept. 30, 1952